June 12, 1956
K. KIENHÖFER
2,749,759
ELASTICALLY YIELDING CONVEYING
MEANS FOR TELESCOPIC ANTENNAE
Filed Aug. 12, 1954
FIG.1
FIG.2
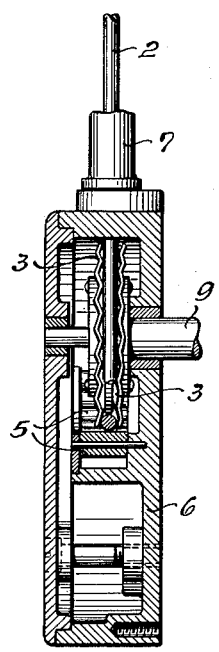
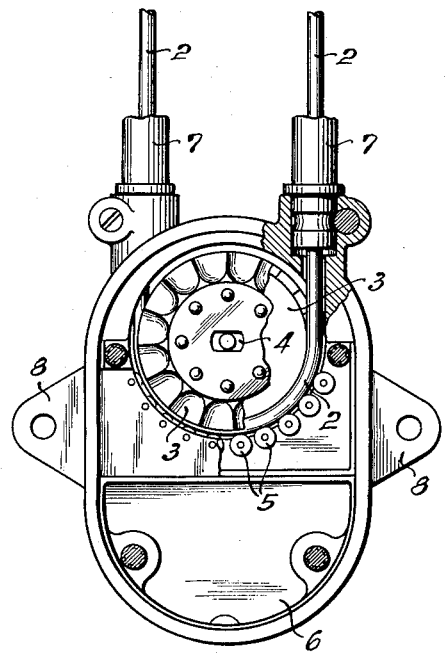
INVENTOR:
KLAUS KIENHÖFER
BY:

United States Patent Office 2,749,759
Patented June 12, 1956

2,749,759

ELASTICALLY YIELDING CONVEYING MEANS FOR TELESCOPIC ANTENNAE

Klaus Kienhöfer, Niefern, Baden, Germany, assignor to Wilhelm Sihn, Jr. K.-G., Niefern, Baden, Germany, a firm Application August 12, 1954, Serial No. 449,403

Claims priority, application Germany August 26, 1953

5 Claims. (Cl. 74—95)

The present invention relates to elastically yielding conveying means for telescopic antennae, and consists in certain improvements upon the device for the same purpose set forth in my United States main patent application Serial No. 381,540 filed September 22, 1953.

My aforesaid United States main application describes an elastically yielding conveying means of this type and a circumferentially grooved actuating wheel for the conveying means, whereby the grooved actuating wheel is provided with undulating side walls.

In the form of construction disclosed in the aforesaid United States main application the elastically yielding conveying means extend in a direction tangential to the circumference of the circumferentially grooved wheel (arc of contact =0), and tangential also to the circumference of the roll which exerts counter-pressure aaginst the conveying means.

In the construction disclosed in the present invention, the actuation of the conveying means (in inward and outward direction) is considerably improved by the feature that the arc of contact is no longer equal to 0, and that, furthermore, a plurality of counter-pressure exerting rolls are arranged along the arc of contact.

In a construction like this, the cross-section of the groove is preferably of rectangular shape, whereby the depth of the groove approximately equals in length the diameter of the conveying means, and whereby the width of the groove is either equal to, or somewhat longer than the diameter of the conveying means.

The result is that the conveying means, when subjected to pull, rest on three sides (laterally and on the lower side) against the circumference of the grooved wheel. While, when feeding pressure is exerted upon the conveying means, the latter rest laterally against the grooved wheel, and on the lower side of the grooved wheel against the aforesaid plurality of counter-pressure exerting rolls, which preferably should be of cylindrical formation.

In this way the space taken up by the conveying device is reduced to a minimum, and its manipulation simplified as much as possible. The conveying device may simply be slipped over the shaft journal of the driving motor and be flanged to the latter.

My invention will be best understood from a consideration of the following detailed description taken in connection with the accompanying drawings, forming a part of this specification and in which an embodiment of the invention has been shown by way of example. However, I wish to say that the invention is not confined to any strict conformity with the showing of the drawings, but may be changed or modified, so long as such changes or modifications mark no material departure from the salient features of the invention as expressed in the appending claims.

In the drawings, in which like parts are referred to by the same reference numerals, Fig. 1 is a lateral sectional view of the device;

Fig. 2 is a front view of the device.

Referring now to the drawings in detail, the reference numeral 2 designates the conveying means, consisting of a cord or rod of elastically yielding material. The conveying means 2 embrace the grooved wheel 3 provided with lateral undulating portions, whereby the arc of contact of the conveying means with the wheel equals approximately 180 degrees. The grooved wheel 3 is driven from the motor (not illustrated in the drawings) by the shaft 9 via the angular hole 4. Provided along the arc of contact are a plurality of rolls 5 in such manner that the portion of the conveying means projecting from the groove of the wheel rests against these rolls 5. The grooved wheel 3 and the rolls 5 are arranged in a casing 6, carrying the detachable guide sleeves 7 for the conveying means, and the flanges 8 by means of which the casing 6 is fastened to the driving motor or to the frame of the car.

In a preferred form of construction the grooved wheel is provided on both sides with an undulating side-wall in such manner that a wave-crest always confronts a wave-trough and that the cross-section of the groove is of rectangular shape, so that jamming of the conveying means within the groove is reliably prevented.

What I claim as new and desire to secure by Letters Patent of the United States is:

1. In a device for the actuation of telescopic antennae used on motor vehicles and provided with a conveying means of elastically yielding material in rod-like formation fastened at one end to the antenna, a rotatable circumferentially grooved actuating wheel for said rod-like conveying means having its circumferential groove provided with undulating side-walls guiding means for guiding said rod-like conveying means into and out of said device and bending the same through a desired angle, and a plurality of radially spaced counter-pressure rolls arranged around that part of the outer circumference of said wheel which is in contact with said conveying means, said conveying means passing between said outer circumference of said wheel and said counter-pressure rolls.

2. A device as specified in claim 1, in which the cross-section of the groove of said grooved actuating wheel is of substantially rectangular shape, and in which the depth of the groove approximately corresponds to the diameter of the conveying means.

3. A device as specified in claim 1, in which the width of the groove of said grooved actuating wheel at least corresponds to the length of the diameter of the conveying means.

4. A device as specified in claim 1, in which said plurality of counter-pressure exerting rolls are of cylindrical formation.

5. A device as specified in claim 1, including a housing adapted to accommodate said device and provided with means for flanging it to a driving motor.

References Cited in the file of this patent

UNITED STATES PATENTS 2,233,222   Paton _____ Feb. 25, 1941

FOREIGN PATENTS 3,047   Great Britain _____ Feb. 25, 1941
3,242   Great Britain _____ of 1876